United States Patent
Eiler

(10) Patent No.: US 7,484,668 B1
(45) Date of Patent: *Feb. 3, 2009

(54) BUILDING PROTECTION SYSTEM AND METHOD

(75) Inventor: Greg G. Eiler, Walnut Creek, CA (US)

(73) Assignee: Building Protection Systems, Inc., Walnut Creek, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 11/242,297

(22) Filed: Oct. 3, 2005

(51) Int. Cl.
*F24F 7/00* (2006.01)
*G08B 21/00* (2006.01)
*G08B 17/10* (2006.01)
*G08B 29/00* (2006.01)

(52) U.S. Cl. ............... 236/49.3; 340/627; 340/632; 340/511

(58) Field of Classification Search .......... 236/49.3; 340/627, 632, 506, 511; 454/256, 254, 257, 454/239, 902, 909
See application file for complete search history.

(56) References Cited

U.S. PATENT DOCUMENTS

| | | | |
|---|---|---|---|
| 4,380,187 A | 4/1983 | Wicks | |
| 4,960,041 A | 10/1990 | Kiser | |
| 5,215,499 A | 6/1993 | Eberhardt | |
| 5,720,659 A | 2/1998 | Wicks | |
| 6,072,397 A * | 6/2000 | Ostrowski | 340/588 |
| 6,293,861 B1 | 9/2001 | Berry | |
| 2004/0064260 A1* | 4/2004 | Padmanabhan et al. | 702/19 |
| 2005/0190058 A1* | 9/2005 | Call | 340/539.26 |
| 2008/0015794 A1* | 1/2008 | Eiler et al. | 702/33 |

FOREIGN PATENT DOCUMENTS

DE      27 43 107      4/1979

OTHER PUBLICATIONS

PCT Search report and written opinion mailed Jul. 8, 2008 for a foreign counterpart of this patent application.

* cited by examiner

*Primary Examiner*—Chen-Wen Jiang

(57) ABSTRACT

An improved building protection system in a building having an inlet air duct for bringing an atmospheric air steam into the building, a damper in such air duct operable to regulate atmospheric air stream passing through the duct, a return air duct with a damper in such duct operable to regulate the return air stream mixed with the inlet air stream and a fan system means operable to suck an atmospheric air stream into the air duct and the return air stream into a return duct, an improved building protection system employing paired sensors for the same toxic agent in the ducts, logic means monitoring the outputs of the paired sensors operable to determine the parity of such outputs, logic means monitoring the outputs of the paired sensor operable to indicate the presence of such toxic agent and control means connected to the logic means operable to shut down the building's HVAC system only when the outputs have substantial parity and presence of such toxic agent is detected by said sensors. In practice a plurality of paired sensors are used, each paired sensors operable to detect a specific toxic agent.

4 Claims, 2 Drawing Sheets

BUILDING PROTECTION SYSTEM AND METHOD

BACKGROUND

Currently commercial office buildings do not have adequate protection against readily available chemicals and nuclear agents which terrorists can easily obtain in the open market. For example, chlorine and bromine gases can be purchased at pool supply outlets and cyanide pellets can purchased as jeweler's cleaning agents. If contaminates, such as these, are released into a building's heating, ventilation and air conditioning system [HVAC system] there may not be any perception of danger by the potential victims within the building until it is too late. In the case of cyanide, just a little bit will kill you (166 ppm—LD 50).

In the past, concerns have arisen about combustion based pollutants in the air supplied to a building's HVAC system where motor vehicles operate close to its air intakes. A protection system for such pollutants, is illustrated in U.S. Pat. No. 5,462,485 to Kinkead and designed to vary the amount of outside air drawn into a building in response to the concentration of such combustion pollutants in the outside air stream entering the building's air intake to avoid toxic levels of combustion pollutants.

Systems also have been developed to response to emergency conditions caused by the presence of smoke or similar harmful gases in buildings, see e.g., U.S. Pats. Nos. 4,380,187 and 5,720,659 to Wicks (using plumbing to provide life supporting oxygen to bathrooms within a building under pressure), 4,960,041 to Kiser (using vents and return air to exhaust interior of building), 5,215,499 to Eberhardt (using water powered fans to pressurize individual safe spaces in a building to purge contaminates in localized areas) and 6,293,861 to Berry (using pressurized air to purge a building of contaminants after they are sensed in the building. Also see German Patent issued to Kessler & Luch gmbh No. 27 43 107 (teaches cutting off inlet air to HVAC system when contaminants are detected in the inlet air stream).

The current invention recognizes that most commercial HVAC systems use return air as part of the total air circulation system. Thus, to avoid injury from toxic materials entering a building, both in the in-coming (outside) air stream and the air stream which is re-circulated (return air stream), must be monitored, as toxic materials may be released within a building and only present in the return air stream. Also the current invention adds radiological sensors, providing an addition level of protection, plus numerous enhancements, to avoid false positives.

The current invention is capable of simultaneously responding to multiple airborne contaminants found in the incoming air stream, and/or in the return air stream which re-circulated in a building, e.g., chlorine, bromine, carbon dioxide, ammonia, hydrogen cyanide, hydrogen sulfide, nitric oxide, nitrogen dioxide, among others, including radioactive agents.

Importantly the current invention introduces measures that essentially eliminate false positives from the sensors which, in their absence, might result in an expensive, unnecessary shut down of a building's HVAC system.

An object of the present invention is to provide a novel and improved system and method for responding to the presence of hazardous agents in the air streams circulating in the HVAC system of a commercial building.

Another object of the present invention is to provide a novel and improved system and method for protecting a building from airborne chemical and nuclear agents by detecting in real time their presence and immediately closing off the inlet air stream and the return air stream to the HVAC system, along with shutting off the fans, to avoid any further contamination of a building and/or injury to occupants of the building.

Still another object of the present invention is to provide a novel and improved system and method for protecting a building from airborne chemical and nuclear agents using a network of paired sensors for each agent to be sensed operable to sense parity between such sensors before activating the shut down of a building's HVAC system.

Another feature of the invention is using parity between sensors to determine if a sensor fault has occurred based on lack of parity between the paired sensors at any time the system is on line.

Another object of the present invention is to provide a novel and improved method and system for protecting a building from airborne chemical and nuclear agents wherein the building's controls activate dampers closing off inlet air stream to the HVAC system, dampers closing off the return air stream, and turn off the fans, in response to a signal from the building protection system of this invention, when a toxic agent is detected in the HVAC system's circulating air streams.

Another object of the present invention is to provide a novel and improved method and system for protecting a building from airborne chemical and nuclear agents which employs video monitors that observe and record areas of access to the building protection system and reports such video data to a remote location when unauthorized personnel attempt to access the system or the normal operation of the system is modified at the building.

A number of other objects and advantages will be apparent when reading this specification and the attached drawings.

SUMMARY OF THE INVENTION

These and other objects of the present invention are accomplished by providing a building protection system responsive to the release of chemical and nuclear airborne agents in the air streams of a building's HVAC system by an array of paired sensors adjacent to the building's dampers (both inlet air and return air dampers), with a control system operable to send a signal to the building's existing control system to close the dampers and turn off the fans, when contaminates are sensed by the sensors in any of air streams in the building.

These sensors operate in real time and are paired so that any lack of parity between paired sensors prevents false positives and will identify sensor failure. Any lack of parity in the system will signal that a sensor fault has occurred thereby providing a continuous check on the proper operation of the sensors.

The building protection system will shut down the HVAC system only when parity exists in the paired sensors and dangerous level of a contaminate is detected.

DESCRIPTION OF THE PREFERRED EMBODIMENTS

Figure 1:
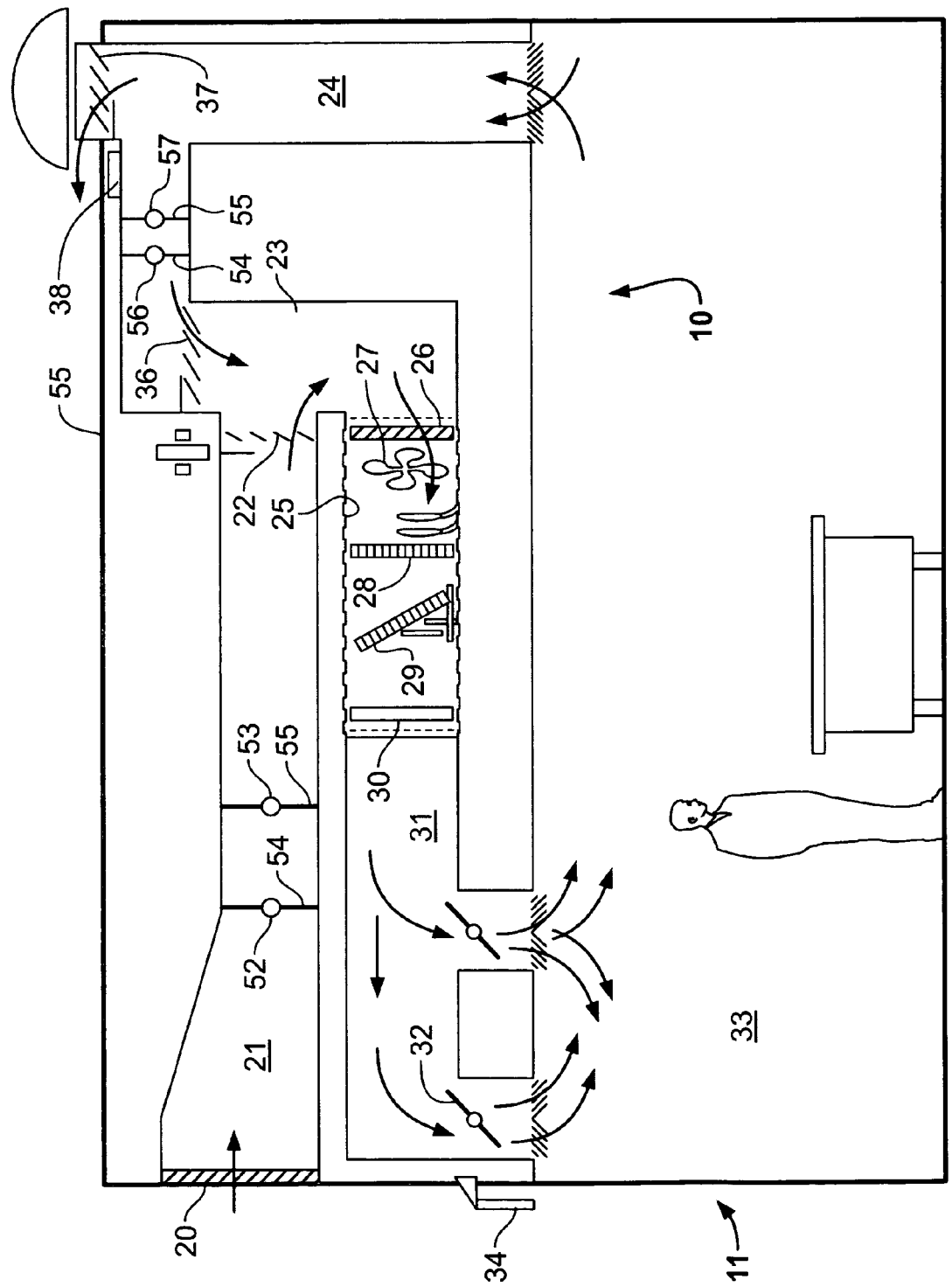
FIG. 1 is a diagram of the typical components of a HVAC system to which this invention is applied by adding the appropriate sensors in the outdoor air inlet duct(s) and the return air duct(s)

Typical components of a HVAC system 10 are illustrated diagrammatically in FIG. 1 for building 11. These components include an outdoor air intake 20, with a inlet duct 21 leading to the outdoor air damper 22 that is capable of closing off the duct. When the damper is open an outside air stream flows into an economizer 23 where it is mixed with the return air stream in the return air duct 24 of the building. The purpose of the economizer is to utilize the temperature differential between outside air stream and the building's return air stream by mixing them, to limit the amount of mechanical cooling or heating the inlet air stream, as well as to maintain a minimum level of fresh air as mandated by the government. Past government regulation required up to 20% fresh air (inlet air) be utilized at all times. When Carbon Dioxide ($CO_2$) monitors are present, fresh air demand can be based on $CO_2$ levels instead of a fixed percent of total air being circulated. Using a lower percent of outside air can reduce energy consumption under certain conditions by limiting the amount of outside air needed to dilute the $CO_2$ levels and by reducing the amount of heating or cooling of the mixed airs stream leaving the economizer.

From the economizer 23, the mixed air stream passes into the supply duct 25 where it passes through a filter 26 being drawn into this duct by a fan 27. The fan drives the mixed air though the heating coils 28, cooling coils 29 and then through a humidifier 30. After the mixed air stream leaves the humidifier it passes into the distribution ducts 31 of the building 11 whereupon it passes through air diffusers 32 into the occupied spaces 33. Although multiple personnel spaces are in most buildings, for the purposes of illustration, only one personnel space is illustrated is shown in the drawings.

As can be seen in FIG. 1 an actuator 35 controls the outside air damper 22 and also a damper 36 that determines the amount of return air that is mixed with the outside air in the economizer 23. An exhaust damper 37 along with actuator 38, provides a means to vent the portion of the return air stream not used in the economizer, and which is replaced with air supplied by the inlet air stream.

For such a HVAC system to operate the fan 27 or fan system must create a positive pressure in the supply duct 25 and distribution dusts 31 to circulate the air streams in this duct through out the building 11.

Figure 2:
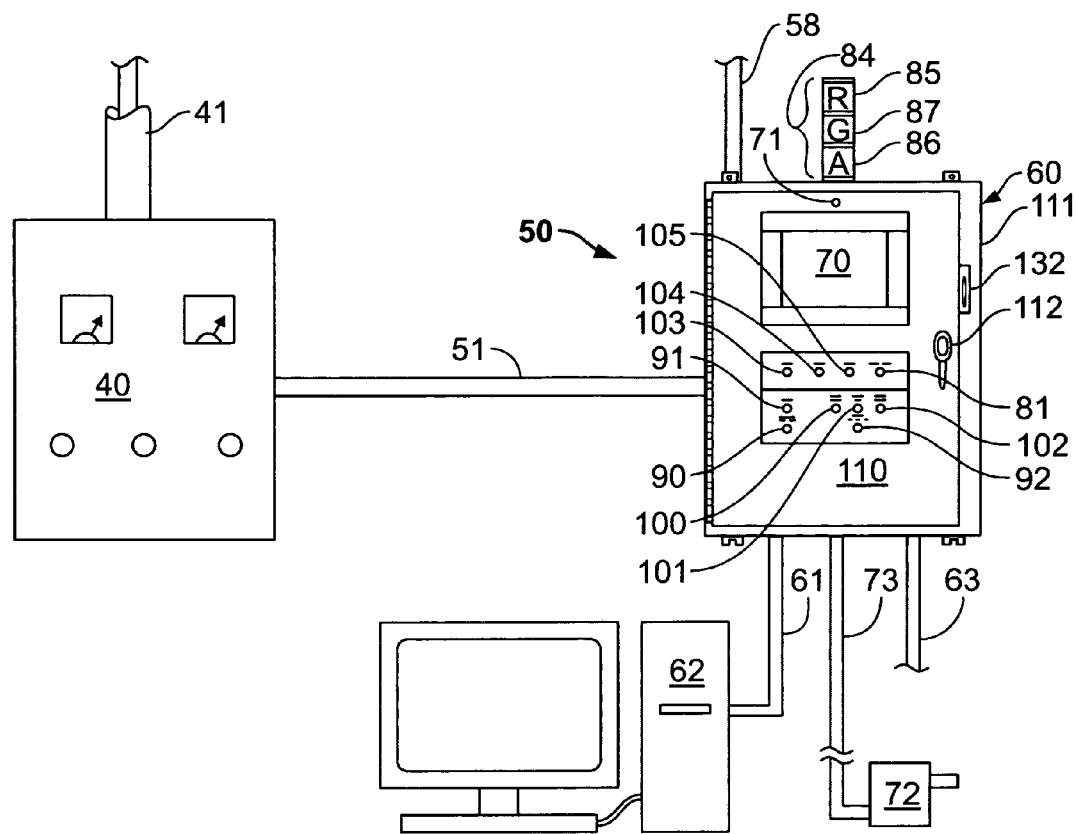
FIG. 2 is also a diagram of the conventional building control system with the novel building protection system of this invention communicating with the building's control system to control the HVAC of the building when a threat occurs.

HVAC control systems [controllers] 40, sometimes referred to the 'building HVAC management system' [BMS], operate the forgoing components on the basis of temperature, humidity and pressure, and may integrate fire, security and lighting functions into this control system. The HVAC components, discussed above, are connected to this control system with wiring 41, as shown in FIG. 2. Such control system or controllers often communicate with one or more personal computers that are used as an operator's or management's interface. The latest HVAC systems use ethernet links, or other means for communications, with the controllers that enable operators to access these controls from a web browser.

Controllers in the building control system 40 are programmable and direct digital control program code may be used to control the operation of the HVAC system components described above. Such programs control time schedules, set-points, logic, timers, trend logs and alarms. Typically the building control system will have analog inputs (e.g., outside air temperature from sensor 34) and digital inputs to control the HVAC system. Digital inputs are typically (dry) contacts from a control device, and analog inputs are typically a voltage or current measurement from variable sensing devices used to control proportional movements of the components (e.g., valves/dampers/motor speed, etc.) in steps or degrees.

The current invention, a building protection system 50, is designed to interface with the building's control system [BMS] 40 and sends the appropriate signals to it through a hardwired connection 51 when a threat to building 11 is detected in the outside air entering the building or detection of a threat occurs in the return air entering the economizer 23. This signal can be accomplished by closing or opening contacts in the building protection system's alarm modules that connect to the building's control system.

According to this invention, the building's control system 40 is programmed to provide override for the normal building shut down procedures and to respond to a signal from the building protection system 50 by immediately (quickly as possible) shutting down the HVAC system of the building 11.

Current HVAC system have normal shut down procedures which typically involve a sequence of first turning off the mechanical cooling devices and pumps, then tower and then supply and return fans together. Such sequences can be as short as 2 minutes and as long as 1 hour. Thus, the air stream flow in the HVAC system, during such a normal shut down, is not actually stopped but merely slows down as the sequence occurs. If toxic gases or radioactive agents are sensed, safety considerations require a shut down in seconds, not minutes. Thus, when employing the current invention, the building's control system 40 is programmed with a sub-program for an immediate shut down of the components of the HVAC system when a "shut down" signal is received from the building protection system 50.

Referring to FIGS. 1 and 2 a building 11 to be protected by the protection system 50 has chemical sensors 52 and nuclear/radiation sensors 53 located in all the air inlets, and return air ducts of the building's air system [HVAC system], air inlet duct 21 is illustrative. These sensors are typically up stream from the outdoor air damper(s) 22 and return air damper(s) 36 on a strut type structure 54 and 55 which places these sensors in the core of the air stream entering the duct 21 so turbulent or laminar air flows along the walls of the duct will not interfere with the detection of gases and radioactive isotopes by these sensors. The struts are custom designed to limit the resistance they create to the air flow in duct 21 and return air duct 24 and are designed so a number of sensors can be deployed on each strut with compression type clamps.

Moreover the sensors 52 and 53 are preferably placed as close to the inlet 20 of the inlet air duct in order to give the earliest possible detection of toxic agents entering the building from outside sources.

Sensors 56 and 57 they are positioned adjacent to the dampers 36 controlling the amount of return air entering the economizer 23 from thereturn air stream. These sensors are located so they are downstream from the last return air stream duct from the building and generally up stream of the dampers 36. Without these sensors, a terrorist could release toxic materials somewhere inside a building which would be circulated through the entire building by the return air entering the economizer without ever passing the sensors 52 and 53 in the inlet air duct 21.

The chemical or gas sensors 52 and 56 are typically electrochemical cells which are self powered micro fuel cells. Such cells have a housing or casing containing a gel or electrolyte and two active electrodes, a working electrode (anode) and the counter-electrode (cathode). The top of the casing has a membrane which can be permeated by the gas sample and allows a gas sample to diffuse onto the cell. Oxidation takes place at the anode and reduction takes place at the cathode. A current is created as the positive ions flow to the cathode and the negative ions flow to the anode which current is sent to the protection panel 60 via cabling 58. Of course in place of cabling, radio frequency transmitters and receivers can be use to link the sensors to the panel 60, as well as line of sight infra red communication systems, if appropriate.

These sensors 52 and 56 are placed so that the membrane of the cell is pointed downward or at the extreme, horizontal, to avoid the accumulation of dust, dirt, water and other contaminants on the cell membrane. Optimal placement is down and perpendicular to the air stream flow. In dirty environments, these sensors can be fitted with dust shields or guards to further protect them for dirt and moisture. Such cells can be selected from General Monitor #TS400, or the M series sensors built by RKI Instruments, Inc., in Union City Calif. which provides sensors for detection in low-level concentrations of specific gases in an air stream where the sensors are positioned. Typically these sensors have extremely low false positive incidents and have an output between 3.6 milliamps and 4.0 milliamps when the gas to be detected is not present. The output increases from between 4 milliamps to 20 milliamps when the sensor detects a specified chemical agent in the air circulating in the HVAC system of a building. In the interests of safety the gas sensors are replaced periodically to ensure the building protection system 50 will always function at an optimal level. While the output of forgoing sensors is indicated as being between 4 and 20 milliamps, other sensors with very different outputs can be employed by simply adjusting the program parameters.

Sensors 53, the radiation detectors, are placed in the optimal position in the inlet air duct 21 to intercept any radioactive isotopes that may enter the air stream from outside the building 11 and which impact on the sensor face. Radiation detectors can be positioned in front or behind sensors 52. Similarly sensors 57, in the return air duct 24, are located adjacent to the gas sensors 56 in this duct. Typically sensors 53 and 57 are a single instrument combining a complete NaI Scintillation probe with a digital pulse processor/amplifier that provides high quality detection and spectroscopic information. However, to maintain redundancy in the building protection system 50, these detectors have two output cards (four outputs) enclosed in a single unit and thus are "paired" sensors (paired sensor means) in a single unit. The frequency of the two output cards is continuously compared to determine if the sensor unit is operating properly in the same manner as the outputs of the separate, but paired gas sensors, are compared.

Decaying isotopes are sensed by these detectors and the dual output cards transmit this event by way of a hard wired cable connection to the panel 60. For detection of radiological agents detectors can be selected from Ortec Corp Model 905, Nucleonics model SAM 935 or AMPTEK "GammaRad" gamma radiation detectors which are modified to have dual output cards. With the proper software, such sensors can identify isotopes of Americium 241, Cesium 134-137, Cobalt 60, Iodine 131, Thallium, Phosphorus 32, Plutonium metal or salt 238-239, Plutonium high-fired oxides 238-239, Polonium 210, Radium 226, Strontium 90, tritium, Uranium Oxides and nitrates 238-235, Uranium High oxides hydrides, carbides, salvage ash 238-235, and depleted Uranium and Uranium Metal 238, as well as others.

The forgoing chemical sensors 52, 56 and radiological sensors 53, 57*+provide a real time, quick response envelop which is necessary to prevent contamination of a building. Biological sensors typically require minutes, if not hours, to develop a positive signal, during which time the building will be completely contaminated, well before the biological contaminant is detected. If biological sensors are developed which have a response envelop in real time (comparable to the chemical sensors and/or radiological sensors described), biological sensors can be integrated to the novel building protection system 50, at a cost proportional to the cost of such biological sensors. In this sense the building protection system is scalable even after it is installed.

It may be argued that protective systems without the capability of sensing the hundreds of contaminates that might be used by terrorists may not be cost effective. However, in the broader picture, protection against the most readily available contaminates provides a level of safety which makes such systems cost effective, both from the liability standpoint and comfort level of the building's occupants when a building is so equipped. On the premise you can't protect against everything, it is prudent to take reasonable steps to eliminate the greatest risks to a building occupants. Insurance companies, when assessing the decreased risks to the occupants of a building equipped with the novel building protection system 50, may offer insurance discounts for buildings so equipped.

At the heart of the building protection system 50 is panel 60 which includes external communication links, one 61 to an operator's system computer 62 and the other 63, to a telephone line or an internet network whereby the status of the panel can be monitored at a remote location. Since the operator's system computer provides critical information to building personnel it is powered by an uninterruptible power supply (not shown) providing at least one hour of operation if normal electrical supply to the building is interrupted.

According to this invention, its communication links are adopted to provide continuous monitoring of the status of building protection system 50 by a servicing company which is located remote to building in which the protection system 50 is installed. The servicing company provides maintenance, sensor changes, and 24/7 monitoring of real time conditions in the building, as reflected in history recorded in the panel 60.

Internally this panel 60 includes its own computer 64 (not shown separately) which computer is integrated with a touch screen monitor 70. This integral computer typically will include a Pentium-4 2.4-3.2 ghz processor w/cd, 3.3 floppy, 1 gigabytes of ram and run Windows XP Professional as its operating system. Such an integrated unit can be purchased from Allen Bradley. The customized software this invention can be operated on this computer or on the external computer 62. The touch screen monitor 70 receives outputs from the selected computer and also provides inputs to the selected computer. In the case of external computer 62 these outputs and inputs are effected though the communication link 61 connecting it to the panel. Typically the panel 60 is located in the engineering spaces and it is convenient to have it connected to computer 62 located in the building's operational spaces so that the operators need not go the engineering spaces to determine the status of the building protection system 50.

This software program includes data by which an identification of an agent sensed by the radiation detectors 53 and 57 can be made. Typically customized Human Machine Interface software is employed whether computer 64 (within the panel) or computer 62 (external to the panel) is employed to control the building protection system 50.

Customization of the software and the PLC employed in the panel 60 allows continuous monitoring of the sensors, provides alarm information and system history, as well as a means to adjust parameters of the system, e.g., set points or trigger points for the sensors.

A wide angel video camera 71 is incorporated in the front of the panel 60 which records video images of persons accessing the panel on one of the computer's hard drive or a digital video recorder [DVR] in the panel. Obviously persons desiring to attack a building might try to disable its protection system by accessing the panel which attempt will be recorded and communicated to the remote station connected to the panel. Video recording by this camera occurs continuously on a loop recording, but the only segment of the recorded data which is saved is the video portion which occurs shortly prior to and after the detection of an unauthorized access or detection of threat to the building [an event]. Typically when such an event occurs the saved data of the video data is transmitted to the remote location of the company servicing the building protection system 50 via the communication link 63.

If desired remote video cameras 72 can be focused to monitor each air intake(s) 20 of the building 11 and connected to the panel via cabling 73. Again the video recording such additional cameras is a loop recording system and is continues with only the segments of the recorded video data saved being that portion immediately prior to and after the detection of an event, e.g., fifteen minutes prior to an event to fifteen minutes after the event.

Computer 64 in the panel 60 or the external computer 62 connected to the panel is programmed to treat a fault or threat in the novel protection system 50 as an event, and the recorded video data can be employed to determine if the event resulted from tampering with the panel 60 or detection of a threat by the sensors.

The gas or chemical sensors 52, as well as the gas or chemical sensors 56, are installed in pairs so that there are two sensors for each type of gas to be monitored and both sensors are connected to the panel 60 through wiring, though other communication links can be used. Computer logic in the panel compares the output of these "paired sensors". If a significant deviation occurs between their respective outputs, a lack of output parity, a "fault" exists and is registered and panel issues a fault alarm. Of course if the detection level of these paired sensors exceed a set threshold and they are in substantial parity, the building protection system 50 immediately signals the building's control system 40 to shut down the HVAC system of the building 11.

While these gas or chemical sensors 52 and 56 have high reliability, they are still subject to failure and a shut down of a building HVAC system on a false positive reading is both expensive and disruptive to commercial activities in a building. Using paired sensors for detecting the same agent almost assures that no false positives will shut down a building's HVAC system; using paired sensors also provides a continuous monitor of the sensors themselves for added safety. For example if one sensor in a set of paired sensors fails, this will result in a lack of parity in the respective outputs, the building protection systems 50 will registered a fault. Such fault in the building protection system 50 will be shown on the both the touchscreen monitor 70 and the remote computer 62 as well as relayed to remote location at which the system is being monitored. Upon the occurrence of such a fault, the malfunctioning sensor can be replaced as it will be identified by the building protection system 50.

As indicated, when both paired sensors have output parity and indicate the presence of a threat to the building, the building protection system 50 will automatically signal the building's BMS system 40 to shut down the HVAC system of the building. The system has a temperature sensors (not shown) where the sensors 52 and 53 are located in duct 21 and where sensors 56 and 57 are located in return air duct 24, which enables the "trigger points" of the paired sensors to be biased with a temperature input, allowing the use of tighter 'set-points' by compensating for thermal drift.

Figure 3:
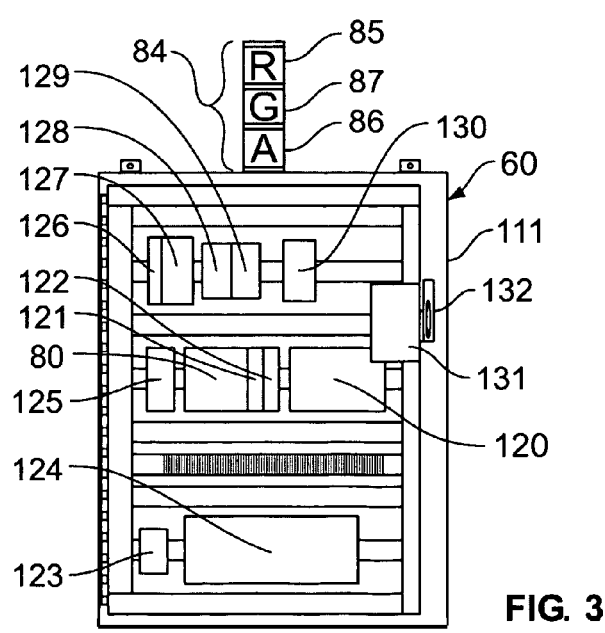
FIG. 3 is an elevation diagrammatically illustrating interior of panel of the building protection system of this invention.

Referring to FIGS. 1, 2 and 3, a building 11 which is to be protected, has the chemical or gas sensors 52 and 56 installed in the ducts. Two sensors for the same gas (e.g., $Cl_2$) are mounted in each duct and hard wired to a programmable logic controller [PLC] 80 within panel 60 by a 18 awg twisted pair shielded cable [not shown]. Each gas sensor is independently wired to a separate input of the PLC. A suitable PLC is a Micrologix 1500 sold by Allen Bradley which has 48 inputs/outputs. An additional Micrologix PLC can be added if more inputs/outputs are needed.

Logic in the PLC 80 compares the output of the paired sensors connected to it for a particular gas or chemical being monitored. If the signal output from each of the paired sensors is not within a preprogrammed variance, PLC 80 registers a fault and lights a RED fault light 81 on surface 110 of panel 60. Upon registering a fault because the output signals of its paired sensors have too great of a variance in their compared outputs, PLC 80 simultaneous sends a signal to computer 62 which then displays the "sensor fault" on touchscreen 70 and its monitor, with communicating link 63 sending the same information to the off site location of the company monitoring the protection system 50.

Panel 60 has the triple stack light 84 on the top thereof, which has a top red light 85, a bottom amber light 86 and a middle green light 87 to provide a visual alert as to the panel's status in the engineering room where it is installed. Normally the green light will be lit indicating the building protection system 50 is on line (Armed) and working properly. If a fault occurs because one of its paired sensors has too great of a variance with the other's output (as discussed above), the PLC will cause the red light 85 to strobe (flash). Three visual indications of a bad sensor are provided at panel 60, one on the touchscreen 70 and another by the flashing red light 85 on the top of the panel and the last is the red fault light 81 on the panel. This PLC will also send a sensor failure signal to a remote monitoring location of the company providing the system and to the external computer 62 in the operating spaces of the building.

When a sensor fault occurs (as described above), the building personnel have the option of leaving the building protection system 50 on line with impaired the ability to monitor for the particular gas monitored by the failed sensor by taking no action or, in the alternative, place the building protection system in a bypass mode. Building personnel have a bypass key and by inserting bypass key into the bypass switch 90 of panel and turning it to the "bypass on" position, the building protection system 50 is disconnected from the building BMS panel 40 but continues to operate and provide continuous real time information about the building as to any chemical or radiological threat via the touch screen 70, monitor of the external computer 62 and at the remote monitoring location. Thus, in "bypass on" position the building operators can still shut down the HVAC system, if a threat is detected and registered as described. Such "bypass on" position will also cause the amber LED 91 on the panel to light indicating this status of the system. In the "bypass on" the key used to switch to the bypass mode is locked in the switch until the switch is returned to the "bypass off" position. When in the "bypass on" position, it is treated as an event and the recorded video data from the wide angle camera in the panel 60 is saved providing a record of the access to the by pass switch in the DVR. In addition the amber light 86 on the top of the panel will glow indicating when the "bypass on" position of switch 90 has been selected.

However, it should be understood that if the system in not in the "bypass on" mode and a single sensor fails, the building protection system 50 is still capable of detecting all other agents in the inlet air and return air streams for which it has sensors and can shut down the HVAC system of the building, if such other agents are detected and pose a threat to the building.

Assuming that sensors 52 (inlet air sensors) or 56 (return air sensors) detect an agent and the respective outputs of the paired sensors for sensing such agent are in parity (within allowable variance of plus or minus 10%) the system will indicate a threat to the building when the respective outputs are above a preset level (normally above between 4 to 20 milliamps). A proprietary software program verifies a toxic agent is present and the PLC will send an emergency shut-down signal to the building's BMS control panel 40. As previously noted a separate program is added to the building's BMS control panel so that when the emergency shut down signal is received from the panel 60 all that is necessary is to implement that separate program to shut down the HVAC system, is opening or closing the alarm relay contacts in the panel to initiate this separate program through communication link 51.

Concurrently with sending the emergency shut down signal to building's HVAC control panel 40, PLC 80 sends a signal to the triple stack light 84, which signal will illuminate the RED stack light 85 in a steady mode and turn off the green light in the stack. An output signal is sent to the touchscreen 70 which then displays a flashing "Emergency Shutdown In Progress" screen at panel 60 and also at the monitor of computer 62 in the operation spaces, plus the equipment at the remote monitoring location. Until the system is reset by authorized personnel utilizing reset key in switch 92 the system will continue to indicate a shut down of the building HVAC system. Alternatively the building protection system 50 can be reset from the remote monitoring location, using the appropriate pass word and instructions.

An option of this invention is the addition of a variable frequency drive (VFD) to all rotating fans in the HVAC system. It purpose is to stop the rotation (kinetic energy) of the fans as quickly as possible during an "emergency building shut down". This feature is operated by the building's own BMS control panel 40 upon receiving a signal from the protection system 50 for an emergency shut down by activating the VFD's "quick stop" or "shaft stop" function. When rotation of the fans are stopped quickly the static pressure created by the fans in the HVAC system will drop, resulting in a small back-flow in the air steams created by the fans to lessen further contamination. Also if desired the dampers 22 and 36 can be replaced with fast acting dampers which will close in the range of 5 seconds verses periods in the range of 30 seconds for normal dampers, which is often the response period of normal dampers.

When the building protection system 50 initiates an Emergency Shut down of the HVAC system, it simultaneously sends such information to the building's computer 62 and to a remote monitoring center so that everyone will be informed an emergency shut down has occurred because of a foreign agent has been detected in the HVAC system. This information enables the building operators to evacuate the building, if applicable, and, also, according to established protocols, communicate the event to the local police, fire or necessary governmental or health authorities, as to the occurrence of the event and nature of thereof.

The radiological sensors 53 and 57 in the inlet air duct 21 and the return air duct 24, respectively, are not paired with a similar sensor but each is equipped with two cards with four outputs which cards are separate sensors within the same unit. These cards are typically connected to separate input channels of PLC 80, and are monitoring for parity in their respective outputs. Failing continued existence of such parity in the outputs of the two cards in any radiological sensor, results in a radiological sensor fault being registered in the building protection system 50. This radiological sensor fault will be display in the same manner as a fault in the gas or chemical sensors 52 and 56 on the touch screen monitor 70 and the monitor of external computer 62, plus at the remote monitoring station. Because of the two output cards, each radiological sensor is a "paired sensors means".

PLC 80 monitors the output signals from the two output cards in each radiation detectors for any variation in output frequency of between the two cards, as a constant check of the sensor's operation; if a deviation in the output frequency occurs for the two cards which exceeds the programmed parameters, the PLC 80 lights a RED fault light 81 on the panel and concurrently sends a signal to computer 64 operating touchscreen 70 that there has been a radiation detector fault causing a "system fault screen" to appear on the touch screen m 70 and the monitor of computer 62, as well as signal the remote monitoring location of the fault in a similar manner. In addition the PLC signals the red light 85 to strobe until a repair is effected.

As indicated each radiological detector 53 and 57 has four outputs. Two outputs are connected to the inputs of the PLC 80 for comparing the output frequencies of the cards and the other two are connected to the ethernet router and modem in the panel 60 so they are routed to computer 64, computer 62 and a computer (not shown) at the remote monitoring locations. Data from these two outputs enables a computer program at several computers to identify the radioactive isotope that caused a radiological sensors to initiate an 'emergency building shut down'. In this regard, the PLC 80 effects a shut down on detection of radiation without the need to identify the particular radioactive agent.

When the failure of a radiological sensor occurs, the building personnel also have the option of allowing the building protection system to remain on line without reliable input from the failed sensor or switching the system to a bypass mode by inserting a key in switch 90 and turning it to the "bypass on" mode. When this is done the amber light 86 in the stack light 84 will glow continuously and amber led 91 on the panel will glow indicating the protections system 50 is not capable of automatically shutting down the building's HVAC system. Further the red stack light 85 will strobe. However, outside of disabling the automatic shut down, the system remains active providing real time monitoring the building's HVAC system for threats which will be displayed on the touch screen 70 and the several monitors located remote to panel 60. If threat occurs when the system is in the "bypass on" position, the building operators can manually shut down the HVAC system.

As indicated switch 92 can only be accessed by authorized service personnel and has multiple positions for servicing the unit. Each position has a corresponding LED adjacent to the switch, an amber LED 100 indicating the switch is in system test, a blue LED 101 indicating the system has been taken off line and a green LED 102 indicating the system is armed (on line). Other LEDs on the panel provide further information on the status of the system, green LED 103 indicating the panel 60 has electrical power, green LED 104 indicating the PLC 80 in the panel is functioning properly and green LED 105 indicating UPS module is operating properly. From these lights and by employing the several switch positions authorized personal having a key for the switch 92 can monitor the operation of the panel and reset its functions.

Typically the panel 60 is housed in a commercial unit, such as a Hoffman type 12 enclosure, having a door 110 that forms the front of the panel and which is hinged to the box portion 111 of the panel along one side. On the side opposite to the hinge is a lockable latch 112. Electrical codes prevent the latch from being locked.

Referring to FIG. 3, showing diagrammatically the interior components of the panel 60, it can be seen it contains PLC 80 having input/output modules (I/O modules) 121 and 122 that are hard wired to sensors 52 and 56 as well as to radiological sensors 53 and 57. PLCs employed with the invention have 48 I/O ports for such sensors. Thus while the specification only describes the operation of a single set of paired sensors and radiological sensors with paired output cards, in reality there will be a plurality of paired gas or chemical sensors like 52 and 56 connected to the I/O ports, matching the spectrum of the agents to be sensed by the building protection system 50. Likewise the outputs of the paired cards in the radiological sensors 53 and 57 are connected to these I/O modules.

These PLCs are powered by 24 volt power supply 123 that is in turn powered by an uninterruptible 120 volt power supply 124 (UPS) that insures power to the panel's components for at least one hour in case of loss of the normal electrical supply to the building. Connected to PLC 80 is ethernet module 125 that enables to the PLCs to communicate with components outside the panel 60, such computer 62, and a remote monitoring station (not shown). Such communication is established thorough an ethernet router 126 and a modem 127 in the panel. The other two outputs of each radiological sensor 53 and 57 are connected to the ethernet router so that data can be sent to the computer programs to identify the radioactive agent that has triggered the system. Also in the panel are two alarm relays 128 and 129 that enable the panel close or open a set of contacts, which ever is appropriate, to activate the sub-program in the HVAC control system 40 of the building to shut down the HVAC system due to the detection of a threat.

Included in the box 111 is a digital video recorder [DVR] 130 which continuously records video information on a loop recording so that a segment of the loop recording occurring before an event and post event from the loop can be saved for analysis. As previously indicated a triple stack light 84 is mounted on the top of box 111 and includes a red light 85, a green light 87 and an amber light 86. These lights and the components are connected to one other, as appropriate, by buses or wires (not shown) in the panel 60 so they will function as described. If desired the panel may include a 15 Amp, 3 pole circuit breaker 131 and an exterior trip lever 132 to disconnect the panel from the regular power supply of the building to comply with electrical codes.

The "System Fault" indicating light 81 is a RED LED light in the normally off mode; when the PLC 80 determines that a fault has occurred with any of the chemical agent sensors or the radiological sensors, or internal components in the panel 60, the RED led system fault light will illuminate in a steady mode and the red stack light 85 atop of the panel will strobe.

Authorized personal can place the system 50 in the "TEST MODE" by inserting a key in switch 92 and turning it to the "test mode" at which time the amber LED light 100 will illuminate in a steady mode. When in test mode the key will be locked in the switch 92 until the switch is turned to the "System Armed" position. The key can also be used to turn the system off, by turning the switch to the "System Off" position at which time the blue LED 101 on the panel will light and the key will be locked in the switch 92. As can be appreciated from the forgoing, when authorized personnel access the panel 60 they cannot retrieve the key from switch 92 until this switch is returned to the "System Armed" position which avoids leaving the system in inoperable mode. When in the System Armed position green LED 102 on the panel will glow indicating the system is on line. In addition the green light 87 in the stacked light 84 atop of the panel will glow steady indicating the system is operable.

When switch 92 is turned to the System Armed position the system will go through a "self test mode" to check all of it's components including, the PLC 80, the secondary PLC 120, the UPS 124, the PLC Ethernet module 125, the Ethernet router 126, the modem 126, the PLC I/O modules 121, 122 and the chemical agent sensors 52 and 56 and radiological detectors 53 and 57 during which time the green light 87 will illuminate in a "flashing" or strobe mode. Once the test mode completes this green light will glow steadily indicating the system is on line and operating properly.

The touch screen monitor 70 on the panel 60 provides real time system monitoring screens at the panel and displays the system's status, e.g., "system off", "self test in progress", "power on", "system armed", "system fault" and "bypass on", as well as the alarm status of "all clear". Of course if one or more of the paired sensors detects a threat to the building the touch screen 70 will display "Emergency Building Shut Down" or in the case of a sensor failure, "Sensor Failure" and or "System Fault". Other screens can be accessed by the touch buttons at the bottom of the touchscreen monitor 70, such as help, maintenance, status, history, persons accessing system, etc.

Typically panel 60 is located in the engineering spaces of the building 11 with the sensors located in air ducts remote from the panel. To service the system 50, particularly the sensors, a test kit (not shown) consisting of a monitor and a cable is employed. The cable from the monitor is connected a port in the PLC 80 and the length of the cable is sufficient so that the monitor can be employed adjacent to the sensors. The monitor will display the sensor information available on the touchscreen monitor 70 so that maintenance personnel can see the sensor output at the sensor when servicing the same.

Having described the invention I claim:

1. A building protection system for a building having an inlet air duct with an inlet damper in the inlet air duct operable to regulate an inlet air stream entering the building and passing through the inlet air duct, a return air duct with a return damper in the return air duct operable to regulate a return air stream, and a fan system operable to circulate a mixture of the inlet air stream and the return air stream in the building, the building protection system comprising:

a chemical sensor system operable to detect one or more chemical contaminants, the chemical sensor system being disposed in the inlet air duct upstream of the inlet damper;

a chemical sensor system operable to detect the one or more chemical contaminants, the chemical sensor system being disposed in the return air duct upstream of the return damper;

a radiological sensor system operable to detect one or more radioactive contaminants, the radiological sensor system being disposed in the inlet air duct upstream of the inlet damper;

a radiological sensor system operable to detect the one or more radioactive contaminants, the radiological sensor system being disposed in the return air duct upstream of the return damper; and a control system connected to the sensor systems, the fan system and the dampers, the control system being operable to close the dampers and to turn off the fan system whenever any of the chemical sensor systems detect at least a predetermined level of one or more of the one or more chemical contaminants or whenever any of the radiological sensor systems detect one or more of the one or more radioactive contaminants;

wherein the fan system includes a brake mechanism connected to the control system which is operable to brake rotations of said fan system in response to a signal from said control system whereby an existing positive air pressure upstream of said fan system will diminish and result in a back flow of an air stream upstream of the fan system.

2. A building protection system for a building having an inlet air duct with an inlet damper in the inlet air duct operable to regulate an inlet air stream entering the building and passing through the inlet air duct, a return air duct with a return damper in the return air duct operable to regulate a return air stream, and a fan system operable to circulate a mixture of the inlet air stream and the return air stream in the building, the building protection system comprising:

a chemical sensor system operable to detect one or more chemical contaminants, the chemical sensor system being disposed in the inlet air duct upstream of the inlet damper;

a chemical sensor system operable to detect the one or more chemical contaminants, the chemical sensor system being disposed in the return air duct upstream of the return damper;

a radiological sensor system operable to detect one or more radioactive contaminants, the radiological sensor system being disposed in the inlet air duct upstream of the inlet damper;

a radiological sensor system operable to detect the one or more radioactive contaminants, the radiological sensor system being disposed in the return air duct upstream of the return damper; and a control system connected to the sensor systems, the fan system and the dampers, the control system being operable to close the dampers and to turn off the fan system whenever any of the chemical sensor systems detect at least a predetermined level of one or more of the one or more chemical contaminants or whenever any of the radiological sensor systems detect one or more of the one or more radioactive contaminants;

wherein each chemical sensor system includes two separate chemical sensors and the control system is operable to indicate a fault in the sensor system when a parity level between sensor outputs from the two separate chemical sensors exceeds a factor of 10 percent; and wherein the control system is a programmed computer which includes instructions preventing the protection system from automatically resetting when said control system indicates a fault or has shut the dampers and shut off the fan system.

3. The building protection system of claim 2 wherein the system includes a test system having a monitor and a cable connected thereto, said cable being connectable to the control system and said test system being operable to display status of a sensor system in communication with the control system for servicing said sensor system.

4. A building protection system for a building having an inlet air duct with an inlet damper in the inlet air duct operable to regulate an inlet air stream entering the building and passing through the inlet air duct, a return air duct with a return damper in the return air duct operable to regulate a return air stream, and a fan system operable to circulate a mixture of the inlet air stream and the return air stream in the building, the building protection system comprising:

a chemical sensor system operable to detect one or more chemical contaminants, the chemical sensor system being disposed in the inlet air duct upstream of the inlet damper;

a chemical sensor system operable to detect the one or more chemical contaminants, the chemical sensor system being disposed in the return air duct upstream of the return damper;

a radiological sensor system operable to detect one or more radioactive contaminants, the radiological sensor system being disposed in the inlet air duct upstream of the inlet damper;

a radiological sensor system operable to detect the one or more radioactive contaminants, the radiological sensor system being disposed in the return air duct upstream of the return damper; and a control system connected to the sensor systems, the fan system and the dampers, the control system being operable to close the dampers and to turn off the fan system whenever any of the chemical sensor systems detect at least a predetermined level of one or more of the one or more chemical contaminants or whenever any of the radiological sensor systems detect one or more of the one or more radioactive contaminants;

wherein the control system includes a manual interlock operable to prevent a reset of the protection system by anyone other than a qualified person.

* * * * *